(12) United States Patent
Shi

(10) Patent No.: US 12,669,348 B2
(45) Date of Patent: Jun. 30, 2026

(54) CLUSTERING METHOD AND SYSTEM FOR VEHICLE LINE OF CROWDSOURCED MAP, AND STORAGE MEDIUM

(71) Applicant: Chongqing Changan Automobile Co Ltd, Chongqing (CN)

(72) Inventor: Zuoqin Shi, Chongqing (CN)

(73) Assignee: Chongqing Changan Automobile Co Ltd, Chongqing (CN)

( * ) Notice: Subject to any disclaimer, the term of this patent is extended or adjusted under 35 U.S.C. 154(b) by 204 days.

(21) Appl. No.: 18/427,847

(22) Filed: Jan. 31, 2024

(65) Prior Publication Data

US 2024/0271958 A1 Aug. 15, 2024

(30) Foreign Application Priority Data

Feb. 13, 2023 (CN) .......................... 202310107097.5

(51) Int. Cl.
*G01C 21/00* (2006.01)
(52) U.S. Cl.
CPC ..... *G01C 21/3815* (2020.08); *G01C 21/3841* (2020.08); *G01C 21/3893* (2020.08)
(58) Field of Classification Search
CPC ........... G01C 21/3815; G01C 21/3841; G01C 21/3893; Y02T 10/40; G06V 10/762; G06V 20/58; G06V 20/588; G06F 18/23; G06F 16/29
See application file for complete search history.

(56) References Cited

U.S. PATENT DOCUMENTS 6,385,539 B1 * 5/2002 Wilson ................. G08G 1/0129
340/905
2021/0350147 A1 * 11/2021 Yuan ................. G06F 18/23213

FOREIGN PATENT DOCUMENTS

CN 115410168 A * 11/2022 ........... G06V 10/763

OTHER PUBLICATIONS

Edelkamp, S., et al., "Route Planning and Map Inference with Global Positioning Traces" (Year: 2003).*
Machine Translation of CN-115410168-A (Year: 2022).*
Schroedl, S., et al., "Mining GPS Traces for Map Refinement" (Year: 2004).*

* cited by examiner

*Primary Examiner* — Sahar Motazedi
(74) *Attorney, Agent, or Firm* — JMB Davis Ben-David

(57) ABSTRACT

Described herein is a method including S1: determining to-be-clustered data of different vehicle lines; S2: determining a mean Z value list and a centroid coordinate list of the vehicle line; S3: randomly obtaining a sample from the to-be-clustered data list of the vehicle line, and determining an E neighborhood sample list of a current sample; S4: computing a difference between a mean Z value of the current sample and a mean Z value of an E neighborhood sample, and putting samples that conform to distance threshold determination into a first list; S5: using the current sample as a nucleus seed if a length of the first list is greater than a minimum clustering sample number threshold; S6: repeating steps S3 to S5 until all nucleus seeds that meet requirements and data associated with the nucleus seeds are found; S7: clustering all the nucleus seeds; and S8: merging all the clusters.

13 Claims, 3 Drawing Sheets

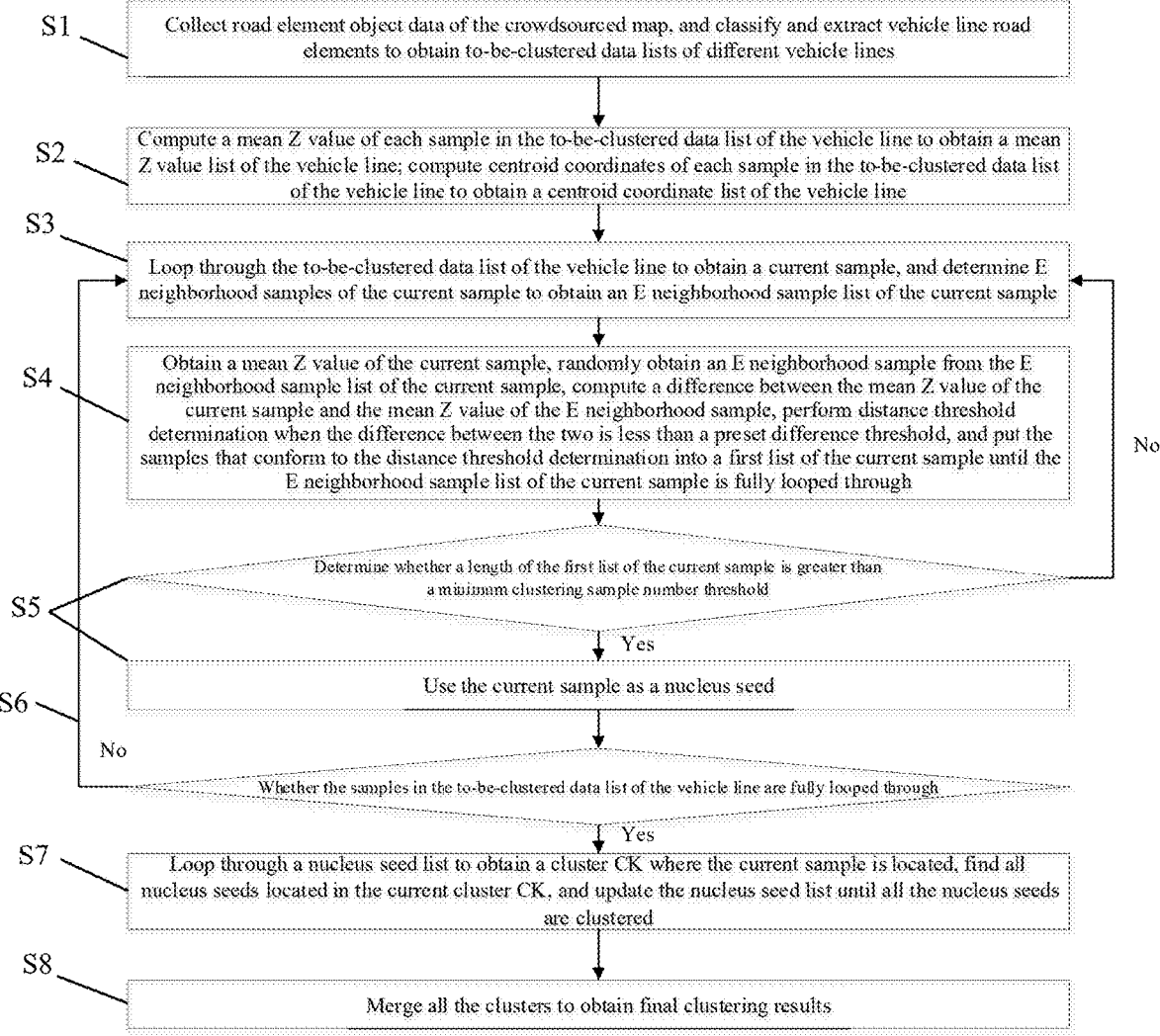

S1 — Collect road element object data of the crowdsourced map, and classify and extract vehicle line road elements to obtain to-be-clustered data lists of different vehicle lines S2 — Compute a mean Z value of each sample in the to-be-clustered data list of the vehicle line to obtain a mean Z value list of the vehicle line; compute centroid coordinates of each sample in the to-be-clustered data list of the vehicle line to obtain a centroid coordinate list of the vehicle line S3 — Loop through the to-be-clustered data list of the vehicle line to obtain a current sample, and determine E neighborhood samples of the current sample to obtain an E neighborhood sample list of the current sample S4 — Obtain a mean Z value of the current sample, randomly obtain an E neighborhood sample from the E neighborhood sample list of the current sample, compute a difference between the mean Z value of the current sample and the mean Z value of the E neighborhood sample, perform distance threshold determination when the difference between the two is less than a preset difference threshold, and put the samples that conform to the distance threshold determination into a first list of the current sample until the E neighborhood sample list of the current sample is fully looped through S5 — Determine whether a length of the first list of the current sample is greater than a minimum clustering sample number threshold Yes S6 — Use the current sample as a nucleus seed No Whether the samples in the to-be-clustered data list of the vehicle line are fully looped through Yes S7 — Loop through a nucleus seed list to obtain a cluster CK where the current sample is located, find all nucleus seeds located in the current cluster CK, and update the nucleus seed list until all the nucleus seeds are clustered S8 — Merge all the clusters to obtain final clustering results No

Fig. 1

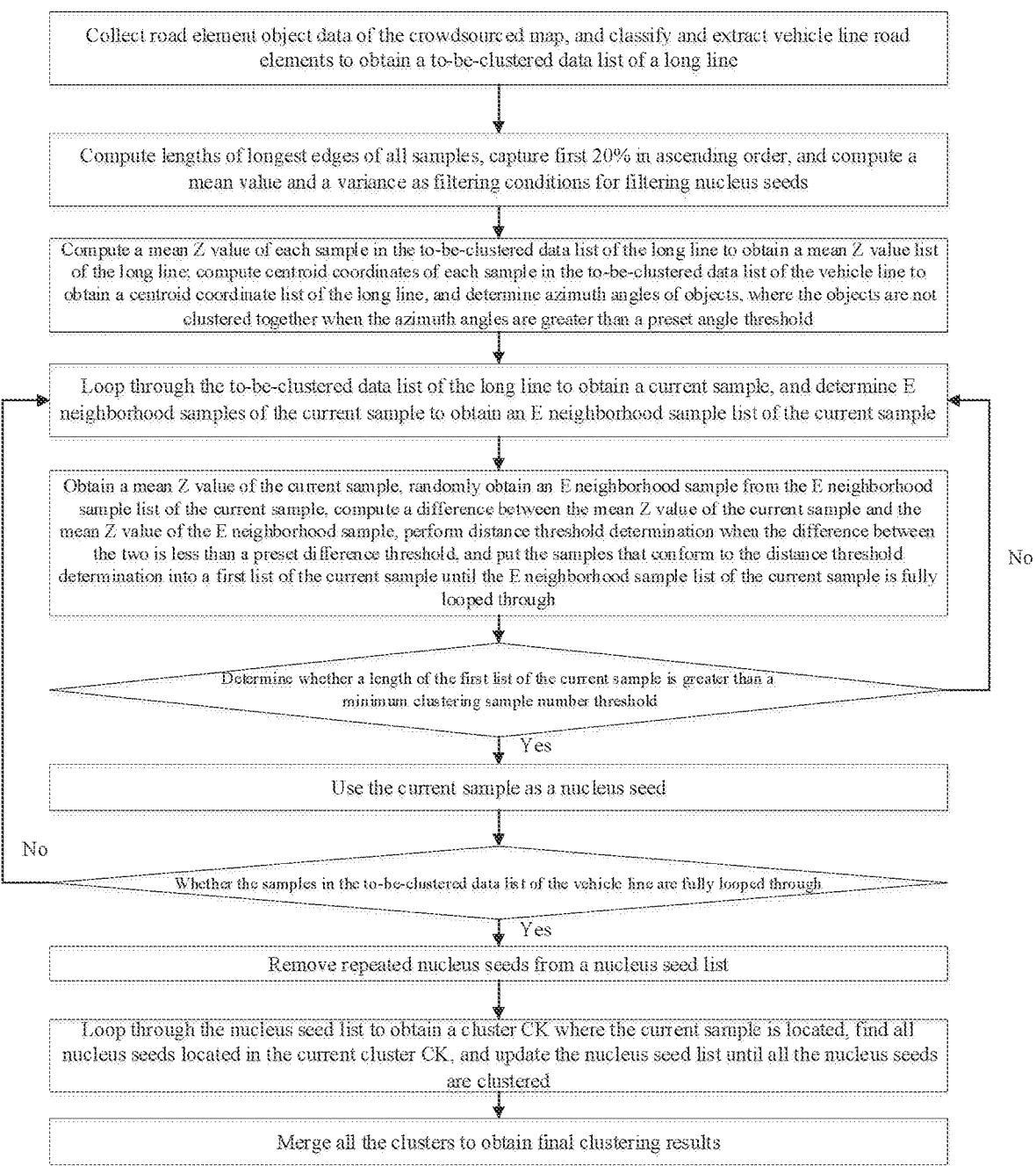

Collect road element object data of the crowdsourced map, and classify and extract vehicle line road elements to obtain a to-be-clustered data list of a long line Compute lengths of longest edges of all samples, capture first 20% in ascending order, and compute a mean value and a variance as filtering conditions for filtering nucleus seeds Compute a mean Z value of each sample in the to-be-clustered data list of the long line to obtain a mean Z value list of the long line; compute centroid coordinates of each sample in the to-be-clustered data list of the vehicle line to obtain a centroid coordinate list of the long line, and determine azimuth angles of objects, where the objects are not clustered together when the azimuth angles are greater than a preset angle threshold Loop through the to-be-clustered data list of the long line to obtain a current sample, and determine E neighborhood samples of the current sample to obtain an E neighborhood sample list of the current sample Obtain a mean Z value of the current sample, randomly obtain an E neighborhood sample from the E neighborhood sample list of the current sample, compute a difference between the mean Z value of the current sample and the mean Z value of the E neighborhood sample, perform distance threshold determination when the difference between the two is less than a preset difference threshold, and put the samples that conform to the distance threshold determination into a first list of the current sample until the E neighborhood sample list of the current sample is fully looped through No Determine whether a length of the first list of the current sample is greater than a minimum clustering sample number threshold Yes Use the current sample as a nucleus seed No Whether the samples in the to-be-clustered data list of the vehicle line are fully looped through Yes Remove repeated nucleus seeds from a nucleus seed list Loop through the nucleus seed list to obtain a cluster CK where the current sample is located, find all nucleus seeds located in the current cluster CK, and update the nucleus seed list until all the nucleus seeds are clustered Merge all the clusters to obtain final clustering results

CLUSTERING METHOD AND SYSTEM FOR VEHICLE LINE OF CROWDSOURCED MAP, AND STORAGE MEDIUM

CROSS REFERENCE TO RELATED APPLICATIONS

This application claims priority to Chinese Patent Application No. 202310107097.5, filed Feb. 13, 2023, the contents of which are incorporated by reference herein in their entirety.

FIELD OF THE INVENTION

The present disclosure belongs to the technical field of high-precision maps, and specifically relates to a clustering method and system for a vehicle line of a crowdsourced map, and a storage medium.

BACKGROUND OF THE INVENTION

The development of artificial intelligence has driven the development of autonomous driving technology rapidly, making the autonomous driving technology highly concerned by the society. The implementation of autonomous driving relies on the assistance of high-precision maps, and the use of crowdsourced maps can collect lane-level vehicle line information. The vehicle line information of roads can be roughly divided into dotted lines, long lines, double solid lines, double dotted lines, and other types of lines. As the most basic constraints and traffic signs for vehicles in the process of driving on the road, vehicle lines can be effectively detected and play a key role in the play of autonomous driving systems.

At present, most consider only clustering of road lane lines, but lack clustering of complex vehicle line information. For example, patent document CN111695389A discloses a clustering method and apparatus for a vehicle line, where the method mentions a method for extracting pixel points related to a lane line from a lane line image to form eigenvectors for clustering and horizontally clustering selected feature point groups according to preset conditions, which has good clustering effects on Y-shaped and V-shaped roads. However, the method excessively relies on preset rules and preset lane reservation conditions in the early stage, and cannot be applied to clustering of complex vehicle lines. For another example, in a clustering method and apparatus for a lane line instance, an electronic device, and a storage medium disclosed in patent document CN112084988A, a lane line eigenvector histogram is mainly obtained according to binary segmentation results of a lane line and lane line eigenvectors, thereby achieving clustering. However, the method has high computational complexity and high quality requirements for clustering networks, and cannot be compatible with poor data sources.

Common clustering methods for lane lines are mostly based on images or features thereof, which cannot distinguish complex vehicle line information well. When faced with a huge data volume and poor data sources, computed quantities of the clustering methods increase greatly, thereby seriously affecting the recognition results of vehicle lines.

Therefore, it is necessary to develop a clustering method for a vehicle line of a crowdsourced map, a storage medium, a device, and a vehicle.

SUMMARY OF THE INVENTION

The present disclosure aims to provide a clustering method and system for a vehicle line of a crowdsourced map, and a storage medium, which can achieve clustering of complex vehicle lines with high computational efficiency.

In a first aspect, a clustering method for a vehicle line of a crowdsourced map described in the present disclosure includes the following steps:

S1: collecting road element object data of the crowdsourced map, and classifying and extracting vehicle line road elements to obtain to-be-clustered data lists of different vehicle lines;

S2: computing a mean Z value of each sample in the to-be-clustered data list of the vehicle line to obtain a mean Z value list of the vehicle line; computing centroid coordinates of each sample in the to-be-clustered data list of the vehicle line to obtain a centroid coordinate list of the vehicle line;

S3: looping through the to-be-clustered data list of the vehicle line to obtain a current sample, and determining E neighborhood samples of the current sample to obtain an E neighborhood sample list of the current sample;

S4: obtaining a mean Z value of the current sample from the mean Z value list of the vehicle line, randomly obtaining an E neighborhood sample from the E neighborhood sample list of the current sample, computing a difference between the mean Z value of the current sample and the mean Z value of the E neighborhood sample, performing distance threshold determination when the difference between the two is less than a preset difference threshold, and putting the samples that conform to the distance threshold determination into a first list of the current sample until the E neighborhood sample list of the current sample is fully looped through;

S5: using the current sample as a nucleus seed if a length of the first list of the current sample is greater than a minimum clustering sample number threshold, and storing, with the current sample, data that conform to the distance threshold determination;

S6: repeating steps S3 to S5 until all nucleus seeds that meet requirements and data associated with the nucleus seeds are found;

S7: looping through a nucleus seed list to obtain a cluster CK where the current sample is located, finding all nucleus seeds located in the current cluster CK, and updating the nucleus seed list until all the nucleus seeds are clustered; and S8: merging all the clusters to obtain final clustering results, where the merging is skipped if a cover area of two clusters is less than a preset cover area threshold, or the merging is performed if a cover area of two clusters is greater than or equal to the preset cover area threshold.

Optionally, after step S6 and before step S7, the following step is further performed:

removing repeated nucleus seeds from the nucleus seed list.

Optionally, step S7 specifically includes:

step 71, looping through the nucleus seed list to obtain a current nucleus seed A, putting the current nucleus seed A into a list list_query, and then solving a difference set of a list set_nucleu and the nucleus seed list to obtain a new nucleus seed list set_nucleu;

step 72, looping through the list list_query when the list list_query is not empty, taking out data sample associated with the current nucleus seed A, and deleting data samples already associated with other nucleus seeds to obtain a cluster CK where the nucleus seed A is located;

step 73, solving an intersection set of the cluster CK where the nucleus seed A is located and the nucleus seed list set_nucleu to obtain all nucleus seeds located in the current cluster CK, and updating the list list_query to obtain a new list list_query; solving a difference set of the cluster CK and the nucleus seed list set_nucleu to obtain a list set_nucleu of all unclustered nucleus seeds; and step 74, repeating steps 71 to 73 until all the nucleus seeds are clustered.

Optionally, in step S2, the computing a mean Z value of each sample specifically includes:

obtaining a point sequence coordinate list of a single geometric object, and determining that the mean Z value of the sample is 0 when a length of the point sequence coordinate list is equal to 0 or greater than 0 and less than 3; and looping through the point sequence coordinate list when the length of the point sequence coordinate list is equal to 3 to obtain each point, determining whether each point contains Z value coordinates, taking out a Z value of the point if the point contains the Z value coordinates, and computing a mean value of Z values of the entire point sequence coordinate list, namely, obtaining the mean Z value of the sample.

Optionally, the vehicle line is any one of a dotted line, a long line, and a double solid line.

Optionally, when the vehicle line is a long line, after step S1 and before step S2, the following steps are further performed:

computing lengths of longest edges of all samples in the to-be-clustered data list of the vehicle line, capturing first d % of data area_list in ascending order, and computing a mean value mean and standard deviation std of the captured data as filtering conditions for filtering the to-be-clustered data list of the vehicle line.

Optionally, the computing lengths of longest edges of all samples specifically include:

assuming an object sample, obtaining a point sequence coordinate list of the object sample, and extracting first three coordinates $a(x_a, y_a, z_a)$, $b(x_b, y_b, z_b)$, and $c(x_c, y_c, z_c)$ of the point sequence coordinate list;

computing a length dis(a,b) of edge ab, a length dis(b,c) of edge bc, and a length dis(a,c) of edge ac of the object sample;

putting dis(a,c) into the list, sorting the longest edges in ascending order, capturing first d % of data area_list, and computing a mean value mean and standard deviation std of the captured data; and using the object sample as a to-be-clustered sample if the difference between the length dis(a,c) of the longest edge of the object sample and the mean value mean is greater than or equal to the negative standard deviation std.

Optionally, when the vehicle line is a long line and a double solid line, azimuth angles of objects need to be determined before nucleus seeds are searched, and if the angles of two long lines are greater than a preset angle threshold, the two long lines are not clustered together.

In this embodiment, in step S4, the distance threshold determination specifically includes:

assuming two objects, with centroid points $M(x_m, y_m, z_m)$ and $N(x_n, y_n, z_n)$;

computing a centroid distance dis(M,N) between the two objects, specifically:

$$dis(M, N) = \sqrt{(x_m - x_n)^2 + (y_m - y_n)^2 + (z_m - z_n)^2}$$

putting the samples that conform to the distance threshold determination into the first list when the centroid distance dis(M,N) between the two objects is less than a preset distance threshold.

In this embodiment, in step S4, the distance threshold determination specifically includes:

assuming two objects A and B, where both object A and object B have K points, namely, $A=[M_1, M_2, \ldots, M_K]$, object $B=[N_1, N_2, \ldots, N_K]$, and a minimum distance min(A,B) between object A and object B is:

$$min(A, B) = min(dis(M_i, N_i), i \in (1, 2, \ldots, K))$$

putting the samples that conform to the distance threshold determination into the first list when min(A,B) is less than a preset distance threshold.

Optionally, if the length of the long line is less than a preset length threshold, the present disclosure considers that there is an error in type determination. For better compatibility with the long line, the long line cluster having a length less than the preset length threshold is determined as a dotted line and put into the to-be-clustered data list of dotted lines for re-clustering.

In a second aspect, a clustering system for a vehicle line of a crowdsourced map described in the present disclosure includes a processor and a memory, where the memory stores a computer-readable program, and when the computer-readable program is called by the processor, the steps of the clustering method for a vehicle line of a crowdsourced map as described in the present disclosure can be performed.

In a third aspect, a storage medium described in the present disclosure stores a computer-readable program, and when the computer-readable program is called, the steps of the clustering method for a vehicle line of a crowdsourced map as described in the present disclosure can be performed.

The present disclosure has the following advantages:

(1) On the basis of conventional DBSCAN clustering algorithms, the present disclosure incorporates strong filtering determination of nucleus seeds, which prevents objects with small areas from becoming nucleus seeds, thereby improving computational efficiency and effectively filtering out abnormal points.

(2) The present disclosure combines factors such as angles, areas, distances, and lengths of objects for comprehensive determination, and can thus be more suitable for practical clustering of vehicle lines.

(3) The present disclosure considers the accuracy of recognizing object elements by vehicle end sensors, and comprehensively considers the basic features of objects for clustering, thereby enabling better fault-tolerant processing.

In summary, the present disclosure combines a plurality of determination elements such as distances, angles, areas, and lengths of vehicle line objects, thereby satisfying the complexity and specificity of clustering of vehicle line factors. The nucleus seeds are skillfully filtered in the clustering process, which effectively improves the efficiency of the algorithm and can well avoid the impact of abnormal points. The present disclosure further performs fault-tolerant processing on recognized erroneous types, which can better be compatible with erroneous data types.

BRIEF DESCRIPTION OF THE DRAWINGS

In order to illustrate the technical solutions of the embodiments of the present disclosure more clearly, the accompanying drawings required for use in the embodiments will be introduce briefly below. It should be understood that the following drawings show only some embodiments of the present disclosure and should not be regarded as limiting the scope, and other relevant drawings can be derived based on the accompanying drawings by those of ordinary skill in the art without any creative efforts.

FIG. 1 is a flowchart of an embodiment;

FIG. 2 is a schematic flowchart illustrating that a vehicle line is a long line in an embodiment.

DETAILED DESCRIPTION OF THE EMBODIMENTS

Figure 3:
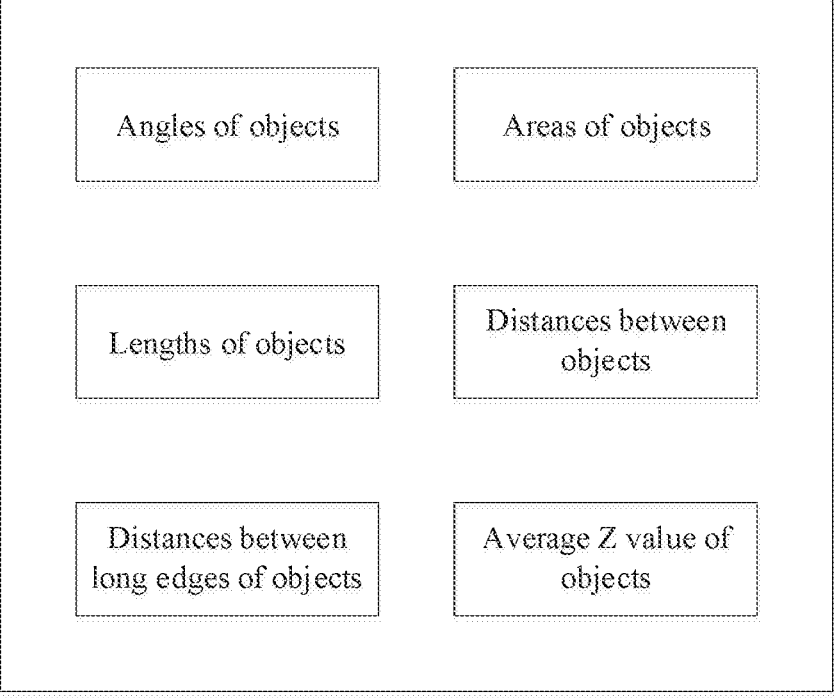
FIG. 3 is a schematic diagram of a plurality of determination elements in an embodiment.

The present disclosure will be explained in detail below with reference to the accompanying drawings.

As shown in FIG. 1, in an embodiment, a clustering method for a vehicle line of a crowdsourced map includes the following steps:

At S1: road element object data of the crowdsourced map are collected, and vehicle line road elements are classified and extracted to obtain to-be-clustered data lists of different vehicle lines;

At S2: a mean Z value of each sample in the to-be-clustered data list of the vehicle line is computed to obtain a mean Z value list of the vehicle line; centroid coordinates of each sample in the to-be-clustered data list of the vehicle line are computed to obtain a centroid coordinate list of the vehicle line;

At S3: the to-be-clustered data list of the vehicle line are looped through to obtain a current sample, and E neighborhood samples of the current sample are determined to obtain an E neighborhood sample list of the current sample;

At S4: a mean Z value of the current sample is obtained from the mean Z value list of the vehicle line, an E neighborhood sample is randomly obtained from the E neighborhood sample list of the current sample, a difference between the mean Z value of the current sample and the mean Z value of the E neighborhood sample is computed, distance threshold determination is performed when the difference between the two is less than a preset difference threshold, and the samples that conform to the distance threshold determination are put into a first list of the current sample until the E neighborhood sample list of the current sample is fully looped through;

At S5: the current sample is used as a nucleus seed if a length of the first list of the current sample is greater than a minimum clustering sample number threshold, and data that conform to the distance threshold determination with the current sample are stored;

At S6: steps S3 to S5 are repeated until all nucleus seeds that meet requirements and data associated with the nucleus seeds are found;

At S7: a nucleus seed list is looped through to obtain a cluster CK where the current sample is located, all nucleus seeds located in the current cluster CK are found, and the nucleus seed list is updated until all the nucleus seeds are clustered;

At S8: all the clusters are merged to obtain final clustering results, where the merging is skipped if a cover area of two clusters is less than a preset cover area threshold, or the merging is performed if a cover area of two clusters is greater than or equal to the preset cover area threshold.

In this embodiment, types of the vehicle line include dotted lines, long lines, and double solid lines. In step S1, extracted dotted lines are put into the corresponding to-be-clustered data list of dotted lines to obtain a to-be-clustered data list of dotted lines; extracted long lines are put into the corresponding to-be-clustered data list of long lines to obtain a to-be-clustered data list of long lines; and extracted double solid lines are put into the corresponding to-be-clustered data list of double solid lines to obtain a to-be-clustered data list of double solid lines.

In this embodiment, in step S2, the mean Z value of each sample is computed as follows:

A point sequence coordinate list of a single geometric object is obtained, and the mean Z value of the sample is 0 when a length of the point sequence coordinate list is equal to 0 or greater than 0 and less than 3; the point sequence coordinate list is looped through when the length of the point sequence coordinate list is equal to 3 to obtain each point, whether each point contains Z value coordinates is determined, a Z value (namely, Point($Z_j$)) of the point is taken out if the point contains the Z value coordinates, and a mean value of Z values of the entire point sequence coordinate list is computed, namely, the mean Z value (namely, $\text{Mean}_z$) of the sample is obtained.

In this embodiment, a computational formula for $\text{Mean}_z$ is as follows:

$$\text{Mean}_z = \left( \sum\nolimits_{j=1}^{p} \text{Point}\,(Z_j) \right)/p; \tag{1}$$

Here, Point($Z_j$) is a Z value of the j-th point in the point sequence coordinate list, j=1, 2, . . . , p; and p is the number of points in the point sequence coordinate list.

In this embodiment, when the length of the point sequence coordinate list is equal to 0, it indicates that the object has no point, namely, no Z value. When the length of the point sequence coordinate list is greater than 0 and less than 3, it indicates that the number of points of the geometric object does not meet a minimum requirement, so subsequent operations are skipped. The minimum requirement for the number of points of the geometric object is 3. The length of the point sequence coordinate list is equal to 3, indicating that the coordinates of the points all have X-axis, Y-axis, and Z-axis coordinates.

In this embodiment, in step S4, the distance threshold determination is as follows:

Two objects are assumed, with centroid points M($x_m$, $y_m$, $z_m$) and N($x_n$, $y_n$, $z_n$);

A centroid distance dis(M,N) between the two objects is computed, specifically:

$$dis(M, N) = \sqrt{(x_m - x_n)^2 + (y_m - y_n)^2 + (z_m - z_n)^2} \tag{2}$$

The samples that conform to the distance threshold determination are put into the first list when the centroid distance dis(M,N) between the two objects is less than a preset distance threshold.

In this embodiment, the distance threshold determination in step S4 may alternatively be as follows:

Two objects A and B are assumed, where both object A and object B have K points, namely, A=[$M_1$, $M_2$, . . . , $M_K$], object B=[$N_1$, $N_2$, . . . , $N_K$], and a minimum distance min(A,B) between object A and object B is:

$$\min(A, B) = \min(dis(M_i, N_i), i \in (1, 2, \ldots, K)) \qquad (3)$$

The samples that conform to the distance threshold determination are put into the first list when min(A,B) is less than a preset distance threshold.

As shown in FIG. 2, in this embodiment, when a vehicle line is a long line, due to the influence of abnormal points, some objects having low density and poor data will become nucleus seeds, thereby affecting a clustering effect. Therefore, before nucleus seeds are filtered, short objects are removed for long line clustering, making them unable to become nucleus seeds. Accordingly, after step S1 and before step S2, the following steps are further performed:

Lengths of longest edges of all samples in the to-be-clustered data list of the vehicle line are computed, first d % of data area_list are captured in ascending order, and a mean value mean and standard deviation std of the captured data are computed as filtering conditions for filtering to-be-clustered samples.

In this embodiment, the lengths of the longest edges of the samples are computed as follows:

An object sample is assumed, a point sequence coordinate list of the object sample is obtained, and first three coordinates a($x_a$, $y_a$, $z_a$), b($x_b$, $y_b$, $z_b$), and c($x_c$, $y_c$, $z_c$) of the point sequence coordinate list are taken out; a length dis(a,b) of edge ab, a length dis(b,c) of edge bc, and a length dis(a,c) of edge ac of the object sample are computed, $$dis(a, b) = \sqrt{(x_a - x_b)^2 + (y_a - y_b)^2} \qquad (4)$$

$$dis(b, c) = \sqrt{(x_b - x_c)^2 + (y_b - y_c)^2} \qquad (5)$$

$$dis(a, c) = \sqrt{dis(a, b)^2 + dis(b, c)^2} \qquad (6)$$

Here, dis(a,c) is the length of the longest edge of the sample; dis(a,c) is put into the list and sorted in ascending order, first d % of data area_list are captured, and a mean value mean and standard deviation std of the captured data are computed. The object sample is used as a to-be-clustered sample if the difference between the length dis(a,c) of the longest edge of the object sample and the mean value mean is greater than or equal to the negative standard deviation std.

In this embodiment, a range of d % is 10% to 20%, depending on an actual situation.

In this embodiment, if the length of the long line is less than a preset length threshold, it is considered that there is an error in type determination of the vehicle line. For better compatibility with the long line, the long line cluster having a length less than the preset length threshold is determined as a dotted line and put into the to-be-clustered data list of dotted lines for re-clustering. Before the length of the long line cluster is computed, a plurality of objects of the long line cluster need to be merged to obtain a latest object, and then the length of the long line cluster is computed using formulas (4) to (6).

In this embodiment, when the vehicle line is a long line and a double solid line, azimuth angles $angle_{dif}$ of objects need to be determined before nucleus seeds are searched. If the angles of object 1 and object 2 are greater than a preset angle threshold, the two objects are not clustered together.

A difference $angle_{dif}$ in the azimuth angles of the two objects is computed as follows:

$$angle_{dif} = angle\ 1 - angle\ 2 \qquad (7)$$

Here, angle1 is the azimuth angle of object 1, and angle2 is the azimuth angle of object 2.

If $angle_{dif}$ is greater than 180 degrees, the following is used:

$$angle_{dif} = 360 - angle_{dif}. \qquad (8)$$

In this embodiment, the computed mean Z value of the sample is stored in the corresponding mean Z value list of the vehicle line, and can be directly called for subsequent use without repeated computation and storage. Similarly, the centroid coordinates of the object are extracted and put into the corresponding centroid coordinate list of the vehicle line for subsequent use.

In this embodiment, after step S6 and before step S7, the following step is further performed: repeated nucleus seeds are removed from the nucleus seed list to improve computational efficiency and accuracy.

In this embodiment, step S7 is specifically as follows:

At step 71, the nucleus seed list is looped through to obtain a current nucleus seed A, the current nucleus seed A is put into a list list_query, and then a difference set of a list set_nucleu and the nucleus seed list is solved to obtain a new nucleus seed list set_nucleu;

At step 72, the list list_query is looped through when the list list_query is not empty, data sample associated with the current nucleus seed A is taken out, and data samples already associated with other nucleus seeds are deleted to obtain a cluster CK where the nucleus seed A is located;

At step 73, an intersection set of the cluster CK where the nucleus seed A is located and the nucleus seed list set_nucleu is solved to obtain all nucleus seeds located in the current cluster CK, and the list list_query is updated to obtain a new list list_query; a difference set of the cluster CK and the nucleus seed list set_nucleu is solved to obtain a list set_nucleu of all unclustered nucleus seeds;

At step 74, steps 71 to 73 are repeated until all the nucleus seeds are clustered.

FIG. 3 shows a plurality of determination elements for a vehicle line in an embodiment, including angles, areas, lengths, distances, distances between long edges, mean Z values, and the like of objects. The method combines a plurality of determination elements such as distances, angles, areas, and lengths of vehicle line objects, thereby satisfying the complexity and specificity of clustering of vehicle line elements. The nucleus seeds are skillfully filtered in the clustering process, which effectively improves the efficiency of the algorithm and can well avoid the impact of abnormal points. The method further performs fault-tolerant processing on recognized erroneous types, which can better be compatible with erroneous data types.

In an embodiment, a clustering system for a vehicle line of a crowdsourced map includes a processor and memory, where the memory stores a computer-readable program, and when the computer-readable program is called by the processor, the steps of the clustering method for a vehicle line of a crowdsourced map in the foregoing embodiment can be performed.

In an embodiment, a storage medium stores a computer-readable program, and when the computer-readable program is called, the steps of the clustering method for a vehicle line of a crowdsourced map in the foregoing embodiment can be performed.

It should be noted that the storage medium shown in this embodiment may be a computer-readable signal medium, a computer-readable storage medium, or any combination of the above two. For example, the computer-readable storage medium may be, an electrical, magnetic, optical, electromagnetic, infrared, or semiconductor system, apparatus, or device, or any combination of the above. More specific examples of the computer-readable storage medium may include, but are not limited to: an electrical connection with one or more wires, a portable computer disk, a hard disk, a random access memory (RAM), a read-only memory (ROM), an erasable programmable read only memory (EPROM), a flash, an optical fiber, a portable compact disk read-only memory (CD-ROM), an optical storage device, a magnetic storage device, or any suitable combination of the above. In this embodiment, the computer-readable signal medium may include data signals in a base band or propagated as some of carriers, in which the computer-readable program is carried. The propagated data signals may be in various forms, including but not limited to electromagnetic signals, optical signals, or any suitable combination of the above. The computer-readable signal medium may alternatively be any other computer-readable medium other than the computer-readable storage medium. The computer-readable medium is capable of sending, propagating or transmitting a program used by an instruction execution system, apparatus or device or a combination thereof. The computer program included in the computer-readable medium may be transmitted by any suitable medium, including but not limited to wireless, wired, or any suitable combination of the above.

The foregoing embodiments are preferred implementations of the present disclosure, but the implementations of the present disclosures are not limited by the foregoing embodiments. Any other changes, modifications, substitutions, combinations, or simplifications made without departing from the spirit essence and principle of the present disclosure shall be equivalent replacements, and shall fall within the protection scope of the present disclosure.

The invention claimed is:

1. A clustering method for a vehicle line of a crowdsourced map, the method used in a precision map to assist automatic driving, comprising the following steps executed from a processor of a clustering system:

S1: collecting data on vehicle line road elements of the crowdsourced map, and classifying and extracting the vehicle line road elements to obtain to-be-clustered data lists of different vehicle lines including the vehicle line;

S2: computing a mean Z value of each sample in the to-be-clustered data list of the vehicle line to obtain a mean Z value list of the vehicle line, wherein each sample in the to-be-clustered data list of the vehicle line is a type of the vehicle line; computing centroid coordinates of each sample in the to-be-clustered data list of the vehicle line to obtain a centroid coordinate list of the vehicle line;

S3: looping through the to-be-clustered data list of the vehicle line to obtain a current sample, and determining E neighborhood samples of the current sample, among each sample in the to-be-clustered data list of the vehicle line, to obtain an E neighborhood sample list of the current sample;

S4: obtaining the mean Z value of the current sample from the mean Z value list of the vehicle line, randomly obtaining an E neighborhood sample from the E neighborhood sample list of the current sample, computing a difference between the mean Z value of the current sample and the mean Z value of the E neighborhood sample, performing distance threshold determination when the difference between the two is less than a preset difference threshold, and putting the E neighborhood samples that conform to the distance threshold determination into a first list of the current sample until the E neighborhood sample list of the current sample is fully looped through;

S5: using the current sample as a nucleus seed when a length of the first list of the current sample is greater than a minimum clustering sample number threshold, and storing, with the current sample, data that conform to the distance threshold determination;

S6: repeating steps S3 to S5 until all nucleus seeds that meet requirements that the length of the first list of each nucleus seed is greater than the minimum clustering sample number threshold, and data associated with the nucleus seeds are found;

S7: looping through a nucleus seed list to obtain a cluster CK where the current sample is located, finding all nucleus seeds located in the current cluster CK, and updating the nucleus seed list until all the nucleus seeds are clustered; and S8: merging all the clusters to obtain final clustering results, wherein the merging is skipped when a cover area of two clusters is less than a preset cover area threshold, or the merging is performed when a cover area of two clusters is greater than or equal to the preset cover area threshold.

2. The clustering method for the vehicle line of the crowdsourced map according to claim 1, wherein after step S6 and before step S7, the following step is further performed:

removing repeated nucleus seeds from the nucleus seed list.

3. The clustering method for the vehicle line of the crowdsourced map according to claim 1, wherein step S7 specifically comprises:

step 71, looping through the nucleus seed list to obtain a current nucleus seed A, putting the current nucleus seed A into a list list_query, and then solving a difference set of a list set_nucleu and the nucleus seed list to obtain a new nucleus seed list set_nucleu;

step 72, looping through the list list_query when the list list_query is not empty, taking out data sample associated with the current nucleus seed A, and deleting data samples already associated with other nucleus seeds to obtain a cluster CK where the nucleus seed A is located;

step 73, solving an intersection set of the cluster CK where the nucleus seed A is located and the nucleus seed list set_nucleu to obtain all nucleus seeds located in the current cluster CK, and updating the list list_query to obtain a new list list_query; solving a difference set of the cluster CK where the nucleus seed A is located and the nucleus seed list set_nucleu to obtain a list set_nucleu of all unclustered nucleus seeds; and step 74, repeating steps 71 to 73 until all the nucleus seeds are clustered.

4. The clustering method for the vehicle line of the crowdsourced map according to claim 1, wherein in step S2, the computing the mean Z value of each sample specifically comprises:

obtaining a point sequence coordinate list of a single geometric object, and determining that the mean Z value of the sample is 0 when a length of the point sequence coordinate list is equal to 0 or greater than 0 and less than 3; looping through the point sequence coordinate list when the length of the point sequence coordinate list is equal to 3 to obtain each point, determining whether each point contains Z value coordinates, taking out a Z value of the point when the point contains the Z value coordinates, and computing a mean value of Z values of the entire point sequence coordinate list, namely, obtaining the mean Z value of the sample.

5. The clustering method for the vehicle line of the crowdsourced map according to claim 1, wherein the vehicle line is any one of a dotted line, a long line, and a double solid line.

6. The clustering method for the vehicle line of the crowdsourced map according to claim 5, wherein when the vehicle line is a long line, after step S1 and before step S2, the following steps are further performed:

computing lengths of longest edges of all samples in the to-be-clustered data list of the vehicle line, capturing first 10% to 20% of data area_list in ascending order, and computing a mean value mean and standard deviation std of the captured data as filtering conditions for filtering the to-be-clustered data list of the vehicle line.

7. The clustering method for the vehicle line of the crowdsourced map according to claim 6, wherein the computing the lengths of the longest edges of all samples specifically comprises:

providing an object sample, obtaining a point sequence coordinate list of the object sample, and extracting first three coordinates $a(x_a, y_a, z_a)$, $b(x_b, y_b, z_b)$, and $c(x_c, y_c, z_c)$ of the point sequence coordinate list;

computing a length dis(a, b) of edge ab, a length dis(b,c) of edge bc, and a length dis(a, c) of edge ac of the object sample;

putting the length dis(a, c) into a list, sorting the longest edges in ascending order, capturing the first 10% to 20% of the data area_list, and computing the mean value mean and the standard deviation std of the captured data; and using the object sample as a to-be-clustered sample when a difference between the length dis(a, c) of the longest edge of the object sample and the mean value mean is greater than or equal to a negative standard deviation std.

8. The clustering method for the vehicle line of the crowdsourced map according to claim 5, wherein when the vehicle line is a long line or a double solid line, azimuth angles of objects need to be determined before nucleus seeds are searched, and when angles of two long lines are greater than a preset angle threshold, the two long lines are not clustered together.

9. The clustering method for the vehicle line of the crowdsourced map according to claim 5, wherein a long line cluster having a length less than a preset length threshold is determined as a dotted line and put into the to-be-clustered data list of dotted lines for re-clustering.

10. The clustering method for the vehicle line of the crowdsourced map according to claim 1, wherein in step S4, the distance threshold determination specifically comprises:

providing two objects, with centroid points $M(x_m, y_m, z_m)$ and $N(x_n, y_n, z_n)$;

computing a centroid distance dis(M, N) between the two objects, specifically:

$$dis(M, N) = \sqrt{(x_m - x_n)^2 + (y_m - y_n)^2 + (z_m - z_n)^2}$$

putting the samples that conform to the distance threshold determination into the first list when the centroid distance dis(M, N) between the two objects is less than a preset distance threshold.

11. The clustering method for the vehicle line of the crowdsourced map according to claim 1, wherein in step S4, the distance threshold determination specifically comprises:

providing two objects A and B, wherein both object A and object B have K points, namely, object A=[$M_1$, $M_2$, . . . , $M_K$], object B=[$N_1$, $N_2$, . . . , $N_K$], and a minimum distance min(A, B) between object A and object B is:

$$min(A,B)=min(dis(M_i,N_i),i \in (1,2, . . . ,K))$$

putting the samples that conform to the distance threshold determination into the first list when the minimum distance min(A, B) is less than a preset distance threshold.

12. The clustering system for the vehicle line of the crowdsourced map, comprising the processor and a memory, wherein the memory stores a computer-readable program, and when the computer-readable program is called by the processor, the steps of the clustering method for the vehicle line of the crowdsourced map according to claim 1 can be performed.

13. A non-transitory storage medium, storing a computer-readable program, wherein when the computer-readable program is called, the steps of the clustering method for the vehicle line of the crowdsourced map according to claim 1 can be performed.

\* \* \* \* \*